Oct. 12, 1937.                F. HEJDUK ET AL                2,095,522
                                FLUID METER
                           Filed March 8, 1934              2 Sheets-Sheet 2
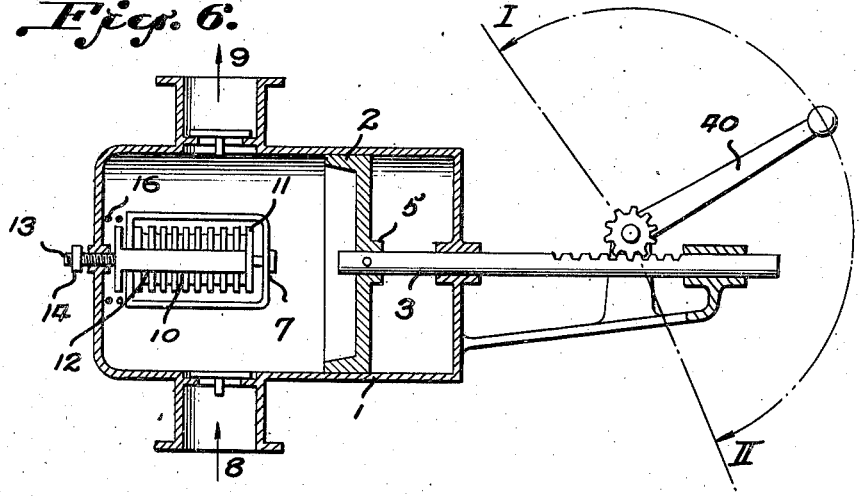
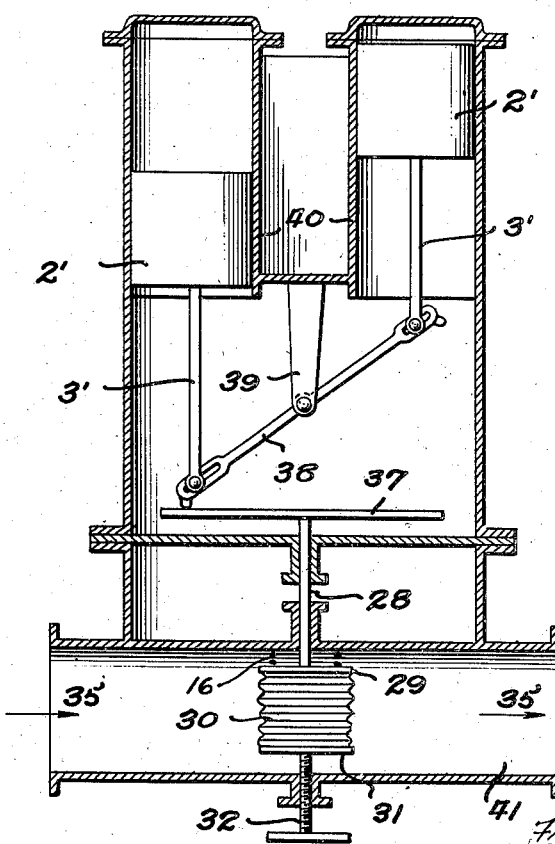
INVENTOR
František Hejduk and
Jan Neumann
By Ben J. Chromy atty Patented Oct. 12, 1937

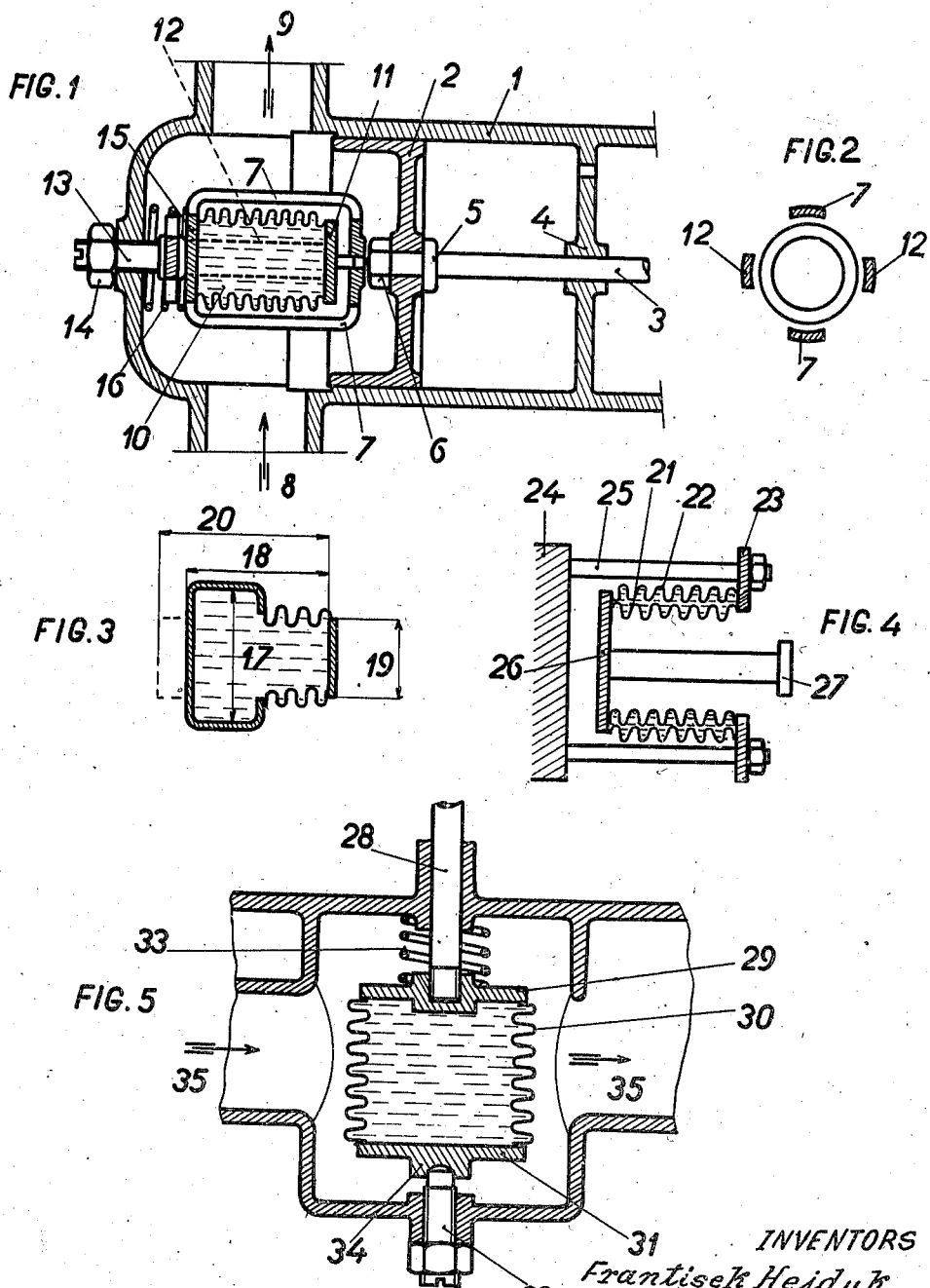

2,095,522

UNITED STATES PATENT OFFICE 2,095,522

FLUID METER

František Hejduk and Jan Neumann, Prague, Czechoslovakia

Application March 8, 1934, Serial No. 714,693
In Czechoslovakia March 10, 1933

5 Claims. (Cl. 73—239)

This invention relates to volumetric liquid-meters, wherein the stroke of the piston or pistons in the measuring cylinders is regulated in accordance with variations of temperature in such a manner that the delivered amount of the measured liquid per reciprocation remains invariable at all temperatures.

It has already been proposed to adopt a mechanical gear which regulates the extent of the stroke of volumetric liquid-meters by means of a bi-metallic thermostat reacting to all variations of temperature. For every liquid to be measured it has been necessary to employ a bi-metallic thermostat of a shape experimentally determined for each individual case, the said thermostat serving to regulate the position of a stop which limits the extent of the piston stroke.

In other arrangements of measuring devices, see for instance the British patent specifications Nos. 170,186, 258,750 or 351,467, the piston moving within the measuring cylinder is arranged to control the opening or closing of inlet and outlet valves as it reaches the limits of its stroke, and within the cylinder is arranged a thermostatic device which ensures that the valves are operated earlier or later in relation to the piston movement to vary the volume of liquid passed through the measuring cylinder in accordance with changes in temperature.

In the present arrangement the inlet and outlet valves are not controlled by the thermostatic device and the volume of the liquid passed through the measuring cylinder at each stroke of the piston is varied directly by alteration of the piston stroke in accordance with variations in temperature by arranging that the piston strikes against a stop rigidly connected to a closed elastic body of a known design, filled with the liquid to be measured or with a liquid having the same coefficient of dilatation, and immersed in the liquid being measured, this elastic body being rigidly secured at one end and having its other end movable to vary the length of the piston stroke.

The elastic body or stroke limiting device is formed by two rigid end plates connected by a corrugated casing so that its length is variable by expansion or contraction of the liquid which it contains and it may have one end enlarged to form a larger container for the liquid or may be of annular form. When the measuring device has a plurality of cylinders, for instance, the type of the liquid meter according to the British Patent No. 348,301 and U. S. Patent 1,893,429, the stroke limiting device acts to vary simultaneously the positions of stops in all the cylinders.

Examples according to the invention are illustrated in the accompanying drawings, wherein Fig. 1 and 2 show a section through the measuring cylinder and the dilatable body; Figs. 3 and 4 represent cross-sections showing alternative forms of said body, while Figs. 5 and 7 show cross-sections of an arrangement of the dilatable body for use in multi-cylindric measuring apparatus with central control of the piston stroke. Fig. 6 represents schematically a general arrangement of a single piston liquid meter.

In the measuring cylinder 1 of Figs. 1 and 2 a piston 2 is fixed on the end of a piston rod 3 provided with the usual collar 5. At the extreme left hand position of the piston, the piston nut 6 strikes on the stirrup 7, while the piston stroke is limited at the right hand end position by the stop 4. The liquid to be measured enters the cylinder through an automatically governed inlet valve in the direction shown by the arrow 8 and is discharged by an automatically governed outlet valve in the direction shown by the arrow 9. The piston rod is set in movement by an external force and each stroke is registered by an indicator. The stroke limiting device or thermostat consists of a metal cylindrical casing or body 10 which is made corrugated to permit an axial dilatation of the body and is secured to a fixed end plate 11 which is supported on a stirrup 12 secured to the end of the meter by a screwed rod 13 and lock nut 14. The other end plate 15 of the thermostat which is movable supports the stirrup 7. The space inside the body is completely closed and is filled with the same liquid as that to be measured or with a liquid having a similar thermal expansion. The length of the column of liquid contained in the body is equal or proportional to the length of the piston-stroke. The movable end plate 15 changes its position at every variation of the temperature and volume of the liquid enclosed in the body, and this results in a corresponding travel of the left hand piston stop by means of the stirrup 7 and ensures a variation of the piston-stroke. If, for instance, a cold liquid is to be measured, the delivered volume must evidently be smaller than a given volume at a normal temperature since as the temperature rises to normal the delivered volume would expand to the given volume. Owing to the reduced temperature of the cold liquid to be measured the liquid in the body 10 and the body itself contract so that the stirrup 7 moves to the right and the piston-stroke is shortened to the correct extent. If the length of the body 10 is equal to that of the piston stroke, the reduction of the stroke has exactly the same value, as the contraction of the liquid column, so that the amount of liquid measured by the apparatus corresponds exactly to that measured at a normal temperature. In order to ensure that the body 10 contracts longitudinally as the contained liquid contracts a spring 16 bears at one end on the movable plate 15 and at the other end on the end of the liquid meter.

A similar device for limiting the piston stroke may also be provided in liquid-flow meters, where instead of one measuring cylinder a certain number of cylinders may be employed; here, the movements of the pistons are dependent on each other and the intake and discharge of the liquid is controlled by a distribution valve. The liquid to be measured flows under pressure, the liquid-meter being thereby set in motion automatically.

The chief condition of exact measurement by means of the above apparatus, is that the temperature of the measured liquid and that contained in the elastic metal body 10 be exactly equal. This condition can usually be fulfilled, owing to the fact that the stroke limiting body 10 is located in the liquid to be measured, which therefore flows around the body; the body itself has a large surface of contact and is made of a good heat conducting substance; finally, the measurement is effected during a long period of time without interruption. The temperature of the surroundings, as well as that of the measured liquid fluctuate moreover in small ranges, as prior to the actual measurement the whole apparatus is in summertime relatively warm and cold in winter.

The stroke-limiting device, that is the body, which is subjected to dilatation due to temperature fluctuations may be differently shaped and constructed in various ways. In Fig. 3 is shown a body of a reduced length 18 and, in part, of a greater diameter 17 but which is equivalent to the volume of a similar smaller cylinder of a length 20 and a diameter 19. The body shown in Fig. 3 may be used in place of the body 10 shown in Fig. 1.

Fig. 4 shows an elastic body consisting of two concentric corrugated cylinders 21 and 22. The inner space between the said cylinders is closed at one end by an annular plate 23, which is secured to a fixed block 24 or the end of the meter by means of bolts 25 while the other end of the space is closed by a movable plate 26 provided with a piston stop 27 which limits the stroke of the piston.

In certain types of multi-cylinder liquid-meters, for instance the British Patent No. 297,409 and the corresponding U. S. A. Patent 1,423,597 of Blum, the amount of liquid flowing through may be controlled in one stroke by a central gear serving to adjust the stroke of all the other pistons simultaneously and for exact correspondence of the amount delivered by the apparatus with the records of the indicator. An arrangement of this type is shown in Figs. 5 and 7. By locating the elastic body 10 in this type of meter within the central adjustment gear an automatic variation of the stroke of all the pistons 2' may be effected in accordance with the fluctuations of temperature in the manner mentioned above. The adjusting screw 32 which may be screwed in or out to vary the stroke of the pistons, does not act directly on the remaining members of the gear, but communicates with the spindle 28 through the elastic body 30 having end plates 29 and 31. A variation of temperature causes an elongation or contraction of the body 30 and changes the position of the end plate or stop 29 and thence, by means of the spindle 28 and the plate 37, the extent of the piston stroke. A spring 33 ensures the contraction of the body 30 under decreasing temperature and the elastic body 30 is located in a chamber through which the liquid to be measured flows in the direction of the arrows 35. The pistons 2', positioned in the cylinders 40 and connected to the member 38 by the piston rods 3', may be driven in a suitable way by part of the liquid flowing through the pipe 41. The member 38 to which the rods 3' are pivoted is pivoted to the member 39 which is attached to the cylinder walls.

The position of the spindle 28 may also be altered by rotating the screw 32, thus obtaining a variation of the volume required to be measured. The distribution device or valve and the flow responsive device proper may be of any suitable type. The travel through which the spindle 28 is moved from its original position must have the same relation to the resulting variation of the piston strokes, as the length of the elastic body bears to the total length of the piston stroke.

In certain cases it is advantageous to fill the elastic body with a liquid such as mercury, having a large coefficient of dilatation in order to reduce as far as posible the length of the column of liquid and hence that of the elastic body.

Fig. 6 represents schematically a general arrangement of a single piston liquid meter according to Fig. 1, for the purpose of clarifying the operation of an apparatus provided with the device of the present invention. The same reference characters are used in Fig. 6 as in Fig. 1. The piston 2 reciprocating in the measuring cylinder 1 is moved by the handle 40 oscillating through the angle I—II. The thermostatically adjustable stop according to the present invention is attached in the manner above described to the end cover of the measuring cylinder 1 and lies in the direction of the length axis of the latter, with its inner free end toward the piston 2. The length of the thermostatic body 10 corresponds to the length of the piston stroke. The inner end of the stirrup 7 moves toward or away from the piston 2 so that the variations of the temperature of the liquid to be measured are constantly eliminated by the corresponding variations of the length of the thermostatic body 10 forming a direct stroke limiting stop.

What we claim is:

1. A device for the correction of errors due to thermal dilatation in piston type volumetric liquid meters, comprising an elastic, stationary body of corrugated shape having a great conductivity of heat and filled with a liquid having the same coefficient of dilatation as the liquid to be measured, a stop supported by one end of said body, said stop being supported by said body to limit the movement of the piston of the liquid meter in accordance with the thermal dilatation of said body, and means for supporting and immersing said body in the liquid being measured.

2. A device for the correction of errors caused by thermal dilatation in piston type volumetric liquid meters as set forth in claim 1, said stop including a spindle for the purpose of limiting the movement of one or more pistons of the liquid meter.

3. A device for the correction of errors due to thermal dilatation in piston type volumetric liquid meters, according to claim 1, and spring means for causing said body to contract longitudinally during contraction of the liquid contained therein.

4. A device for the correction of errors due to thermal dilatation in piston type volumetric liquid meters, comprising an elastic, stationary body of corrugated shape having a fixed end and a movable end, said body comprising a double elastic casing forming a cavity therein, said cavity being filled with a liquid having the same coefficient of expansion as the liquid to be measured, a stop supported by one end of said body, said stop being supported by said body to limit the movement of the piston of the liquid meter in accordance with the thermal dilatation of said body, and means for supporting and immersing said body in the liquid being measured.

5. A device for the correction of errors due to thermal dilatation in piston type volumetric liquid meters, comprising an elastic, stationary body having a great conductivity of heat and filled with a liquid having the same coefficient of dilatation as the liquid to be measured, said body being formed part of corrugated shape and part of substantially smooth wall shape, the portion of said body formed of corrugated shape being substantially less in volume than the part of substantially smooth wall shape, a stop supported by one end of said body, said stop being supported by said body to limit the movement of the piston of the liquid meter in accordance with the thermal dilatation of said body, and means for supporting and immersing said body in the liquid being measured.

FRANTIŠEK HEJDUK.
JAN NEUMANN.